(12) United States Patent
Clark et al.

(10) Patent No.: US 8,832,277 B2
(45) Date of Patent: *Sep. 9, 2014

(54) COMMUNITY TAGGING OF A MULTIMEDIA STREAM AND LINKING TO RELATED CONTENT

(75) Inventors: Bryan Clark, Westford, MA (US);
Havoc Pennington, Westford, MA (US);
Donald Fischer, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 447 days.

This patent is subject to a terminal disclaimer.

(21) Appl. No.: 11/565,077

(22) Filed: Nov. 30, 2006

(65) Prior Publication Data

US 2008/0134054 A1 Jun. 5, 2008

(51) Int. Cl.
*G06F 3/00* (2006.01)
*G06Q 10/10* (2012.01)
*G06F 17/30* (2006.01)
*G06Q 30/02* (2012.01)

(52) U.S. Cl.
CPC ............. *G06Q 30/02* (2013.01); *G06Q 10/10* (2013.01); *G06F 17/30011* (2013.01)
USPC ............................. 709/227; 715/753; 725/34

(58) Field of Classification Search
CPC .......... H04N 21/482; H04N 21/25891; H04N 21/4316; H04N 21/44222; H04N 21/4532; H04N 21/4622; H04N 21/472; H04N 21/6125; H04N 5/45; H04L 65/4084; G06F 17/30011; G06Q 10/10; G06Q 30/02
See application file for complete search history.

(56) References Cited

U.S. PATENT DOCUMENTS

| | | | |
|---|---|---|---|
| 6,018,768 A * | 1/2000 | Ullman et al. | ................ 709/218 |
| 6,317,784 B1 | 11/2001 | Mackintosh et al. | |
| 6,519,648 B1 | 2/2003 | Eyal | |
| 6,526,411 B1 | 2/2003 | Ward | |
| 6,553,180 B1 | 4/2003 | Kikuchi et al. | |
| 6,714,722 B1 | 3/2004 | Tsukidate | |
| 6,763,345 B1 | 7/2004 | Hempleman et al. | |
| 6,957,398 B1 | 10/2005 | Nayeri | |
| 7,069,308 B2 | 6/2006 | Abrams | |
| 7,345,232 B2 | 3/2008 | Toivonen et al. | |
| 7,426,537 B2 | 9/2008 | Lee et al. | |
| 7,684,815 B2 | 3/2010 | Counts et al. | |
| 7,698,801 B2 | 4/2010 | Lourdeaux | |
| 7,730,216 B1 | 6/2010 | Issa et al. | |
| 7,886,010 B1 | 2/2011 | Shankar | |
| 8,239,480 B2* | 8/2012 | Kokes et al. | .................. 709/217 |
| 2001/0018771 A1* | 8/2001 | Walker et al. | .................... 725/91 |
| 2002/0016960 A1* | 2/2002 | Yamato et al. | ..................... 725/1 |
| 2002/0042915 A1* | 4/2002 | Kubischta et al. | ............... 725/38 |
| 2002/0120925 A1 | 8/2002 | Logan | |
| 2002/0156852 A1 | 10/2002 | Hughes et al. | |
| 2002/0188947 A1 | 12/2002 | Wang et al. | |
| 2002/0194598 A1* | 12/2002 | Connelly | ........................ 725/39 |
| 2003/0014419 A1 | 1/2003 | Clapper | |
| 2003/0028595 A1 | 2/2003 | Vogt et al. | |

(Continued)

*Primary Examiner* — Rong Le
(74) *Attorney, Agent, or Firm* — Lowenstein Sandler LLP

(57) ABSTRACT

Embodiments of the present invention allow users to tag a multimedia program or stream with data or pointers to external information related to content of the multimedia program. Users in a social network may tag various aspects of the content, such as a particular actor, a type of car, jewelry, a location, a phrase, etc. This tagging information may then be linked to various websites that provide further information about the tagged content and may be keyed to video offset times.

14 Claims, 6 Drawing Sheets

(56) References Cited

U.S. PATENT DOCUMENTS

| | | |
|---|---|---|
| 2003/0028892 A1* | 2/2003 | Gewickey et al. ............ 725/110 |
| 2003/0050976 A1 | 3/2003 | Block et al. |
| 2003/0093790 A1 | 5/2003 | Logan et al. |
| 2003/0115274 A1* | 6/2003 | Weber ............................ 709/206 |
| 2003/0115585 A1 | 6/2003 | Barsness et al. |
| 2003/0135513 A1 | 7/2003 | Quinn et al. |
| 2004/0078825 A1 | 4/2004 | Murphy |
| 2004/0083273 A1 | 4/2004 | Madison et al. |
| 2004/0128624 A1 | 7/2004 | Arellano et al. |
| 2005/0004985 A1 | 1/2005 | Stochosky |
| 2005/0022251 A1 | 1/2005 | Ohnuma et al. |
| 2005/0038819 A1 | 2/2005 | Hicken et al. |
| 2005/0097173 A1 | 5/2005 | Johns et al. |
| 2005/0114340 A1 | 5/2005 | Huslak et al. |
| 2005/0132401 A1 | 6/2005 | Boccon-Gibod et al. |
| 2005/0138659 A1 | 6/2005 | Boccon-Gibod et al. |
| 2005/0210285 A1 | 9/2005 | Williams |
| 2005/0251411 A1 | 11/2005 | Ishii et al. |
| 2005/0267766 A1 | 12/2005 | Galbreath et al. |
| 2005/0278377 A1 | 12/2005 | Mirrashidi et al. |
| 2006/0020614 A1 | 1/2006 | Kolawa et al. |
| 2006/0041902 A1 | 2/2006 | Zigmond |
| 2006/0143236 A1 | 6/2006 | Wu |
| 2006/0190824 A1 | 8/2006 | Montulli et al. |
| 2006/0195462 A1 | 8/2006 | Rogers |
| 2006/0195479 A1 | 8/2006 | Spiegelman et al. |
| 2006/0195516 A1 | 8/2006 | Beaupre |
| 2006/0195525 A1 | 8/2006 | Page et al. |
| 2006/0195532 A1 | 8/2006 | Zlateff et al. |
| 2006/0212906 A1 | 9/2006 | Cantalini |
| 2006/0239131 A1 | 10/2006 | Nathan et al. |
| 2006/0242234 A1 | 10/2006 | Counts et al. |
| 2006/0242554 A1 | 10/2006 | Gerace et al. |
| 2006/0253584 A1* | 11/2006 | Dixon et al. .................. 709/225 |
| 2006/0277455 A1 | 12/2006 | Yamada et al. |
| 2006/0288041 A1 | 12/2006 | Plastina et al. |
| 2007/0067217 A1* | 3/2007 | Schachter et al. ............. 705/14 |
| 2007/0078993 A1 | 4/2007 | Issa |
| 2007/0106627 A1* | 5/2007 | Srivastava et al. .............. 706/20 |
| 2007/0106672 A1 | 5/2007 | Sighart et al. |
| 2007/0146820 A1 | 6/2007 | Asazu et al. |
| 2007/0157105 A1 | 7/2007 | Owens et al. |
| 2007/0161382 A1 | 7/2007 | Melinger et al. |
| 2007/0162432 A1 | 7/2007 | Armstrong et al. |
| 2007/0168543 A1 | 7/2007 | Krikorian et al. |
| 2007/0169165 A1 | 7/2007 | Crull et al. |
| 2007/0174389 A1 | 7/2007 | Armstrong et al. |
| 2007/0192299 A1 | 8/2007 | Zuckerberg et al. |
| 2007/0220092 A1 | 9/2007 | Heitzeberg et al. |
| 2007/0220554 A1 | 9/2007 | Barton et al. |
| 2007/0255785 A1 | 11/2007 | Hayashi et al. |
| 2007/0266401 A1* | 11/2007 | Hallberg ........................ 725/46 |
| 2007/0277110 A1 | 11/2007 | Rogers et al. |
| 2007/0282949 A1 | 12/2007 | Fischer et al. |
| 2007/0282950 A1 | 12/2007 | Fischer et al. |
| 2008/0010372 A1 | 1/2008 | Khedouri et al. |
| 2008/0040474 A1 | 2/2008 | Zuckerberg et al. |
| 2008/0052371 A1 | 2/2008 | Partovi et al. |
| 2008/0065604 A1 | 3/2008 | Tiu et al. |
| 2008/0092054 A1 | 4/2008 | Bhumkar et al. |
| 2008/0092168 A1* | 4/2008 | Logan et al. .................... 725/44 |
| 2008/0092182 A1* | 4/2008 | Conant .......................... 725/109 |
| 2008/0104521 A1 | 5/2008 | Dubinko et al. |
| 2008/0133475 A1 | 6/2008 | Fischer |
| 2008/0133593 A1 | 6/2008 | Clark |
| 2008/0133638 A1 | 6/2008 | Fischer et al. |
| 2008/0133649 A1 | 6/2008 | Pennington et al. |
| 2008/0133658 A1 | 6/2008 | Pennington |
| 2008/0133696 A1 | 6/2008 | Hanebeck |
| 2008/0133737 A1 | 6/2008 | Fischer et al. |
| 2008/0133763 A1 | 6/2008 | Clark et al. |
| 2008/0134039 A1 | 6/2008 | Fischer et al. |
| 2008/0134053 A1 | 6/2008 | Fischer |
| 2008/0201376 A1 | 8/2008 | Khedouri et al. |
| 2008/0222295 A1* | 9/2008 | Robinson et al. ............. 709/227 |
| 2008/0320139 A1 | 12/2008 | Fukuda et al. |
| 2009/0019374 A1 | 1/2009 | Logan et al. |
| 2010/0162324 A1 | 6/2010 | Mehta et al. |

\* cited by examiner

COMMUNITY TAGGING OF A MULTIMEDIA STREAM AND LINKING TO RELATED CONTENT

DESCRIPTION OF THE INVENTION

1. Field of the Invention

The present invention relates to online services and communications tools and, more particularly, to social networks.

2. Background of the Invention

In its short history, Internet usage has been mainly driven by portals and search engines, such as Yahoo! and Google. Recently, the rapid growth of social networking sites, such as MySpace and Facebook, has revealed a new trend of Internet usage. Social networking generally relates to services and tools that help users maintain and expand their circles of friends usually by exploiting existing relationships. Social networking sites have shown potential to become the places on the Internet where many people spend most of their time, thus making these sites the main entry point for online activity. Often times, these social networking sites can become the focal point of sharing information, such as links, multimedia, music, and the like.

In general, social networking sites and other online services of the Internet offer a mix of features and tools, such as message boards, games, journals or web logs ("blogs"). Many of these sites try to build communities around multi-media or popular culture, such as television, film, music, etc. These sites and their features are designed to keep users clicking on advertising-supported pages of the site. Thus, the known social networking sites employ a closed platform of services that attempt to keep their user-base captive to the site.

The Internet is now crowded with a large number of social networking sites and sharing tools. For example, the recent supremacy of iTunes has triggered a plethora of music service offerings. As another example, the recent success of YouTube and Google Video has sparked an explosion of video-sharing sites. Therefore, most users typically utilize multiple social networking sites and maintain separate accounts on these services.

Unfortunately, it has become difficult for users to share and highlight content across their multiple social networking services. Accordingly, it would be desirable to provide methods and systems that allow users to highlight content that is of high or low value with their social network. In addition, it would be desirable to allow users to provide information that links to external, related content.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention allow users to tag a multimedia program or stream with data or pointers to external information related to content of the multimedia program. Users in a social network may tag various aspects of the content, such as a particular actor, a type of car, jewelry, a location, a phrase, etc. Alternatively, playback data may be collected from users viewing the multimedia program. The playback data may include tagging by the user that indicates various aspects of the content. This tagging information may then be linked to various websites that provide further information about the tagged content and may be keyed to video offset times.

Reference will now be made in detail to the exemplary embodiments of the invention, which are illustrated in the accompanying drawings. Wherever possible, the same reference numbers will be used throughout the drawings to refer to the same or like parts.

Figure 1:
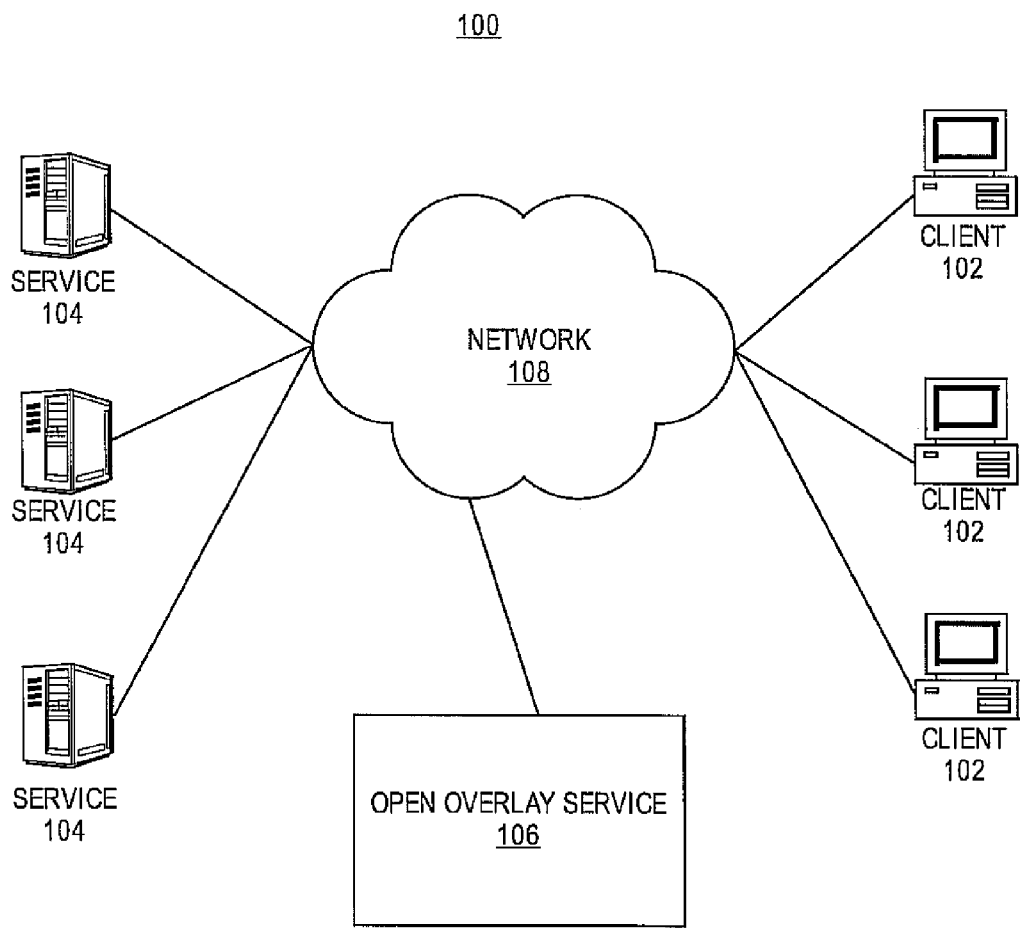
FIG. 1 illustrates an exemplary system that is in accordance with embodiments of the present invention.

FIG. 1 illustrates a system 100 that is consistent with the principles of the present invention. As shown, the system 100 may comprise one or more clients 102, a plurality of services 104, an open overlay service 106, and a network 108. In general, system 100 may be implemented on a widely available data network, such as the Internet. For example, system 100 may be implemented as a combination web site and client application that enables users and friends to participate in a live social context. These components will now be generally described.

Client 102 provides a user interface for system 100. Client 102 may be implemented using a variety of devices and software. For example client 102 may be implemented on a personal computer, workstation, or terminal. In addition, client 102 may run under an operating system, such as the LINUX operating system, the Microsoft™ Windows operating system, and the like. Client 102 may also operate through an Internet browser application, such as Firefox by Mozilla, Internet Explorer by Microsoft Corporation, or Netscape Navigator by Netscape Communications Corporation.

One skilled in the art will also recognize that client 102 may be implemented with various peripheral devices, such as a display, one or more speakers, and other suitable devices. Client 102 may also be implemented with various peripherals for accepting input from a user, such as a keyboard, a mouse, and the like. Although FIG. 1 shows a number of clients 102, system 100 may include any number of clients.

Services 104 are the applications and services that users of system 100 already use. Services 104 may be implemented on one or more servers that are well known to those skilled in the art. Rather than recreating functionality, open overlay service 106 merely interfaces services 104 and allows users to seamlessly continue using the services, such as social networking services, instant messaging, etc., that they currently use. Examples of services 104 include iTunes, Yahoo Music Engine, MySpace, Friendster, AOL Instant Messenger, Yahoo! Messenger, etc. Any sort of online service may be incorporated into the context provided by open overlay service 106.

Open overlay service 106 serves as a social network service and stores, manages, and provides access control to the various services and social networks of clients 102. In general, open overlay service 106 is essentially a web site and application service that stores and forwards information shared by users, as well as user profiles and social network information. Open overlay service 106 may be hosted as a public instance, similar in fashion to a service, such as Wikipedia. In addition, open overlay service 106 may provide various application programming interfaces that have an open specification so that anyone can create an interface.

For example, open overlay service 106 may process requests to retrieve an object, document, image file, web page, and the like. Open overlay service 106 may be implemented using a variety of devices and software. For example, open overlay service 106 may be implemented as a web site running on one or more servers that support various application programs and stored procedures.

The components of system 100 may be coupled together via network 108. Network 108 may comprise one or more networks, such as a local area network, the Internet, or other type of wide area network. In addition, network 108 may support a wide variety of known protocols, such as the transport control protocol and Internet protocol ("TCP/IP") and hypertext transport protocol ("HTTP").

Figure 2:
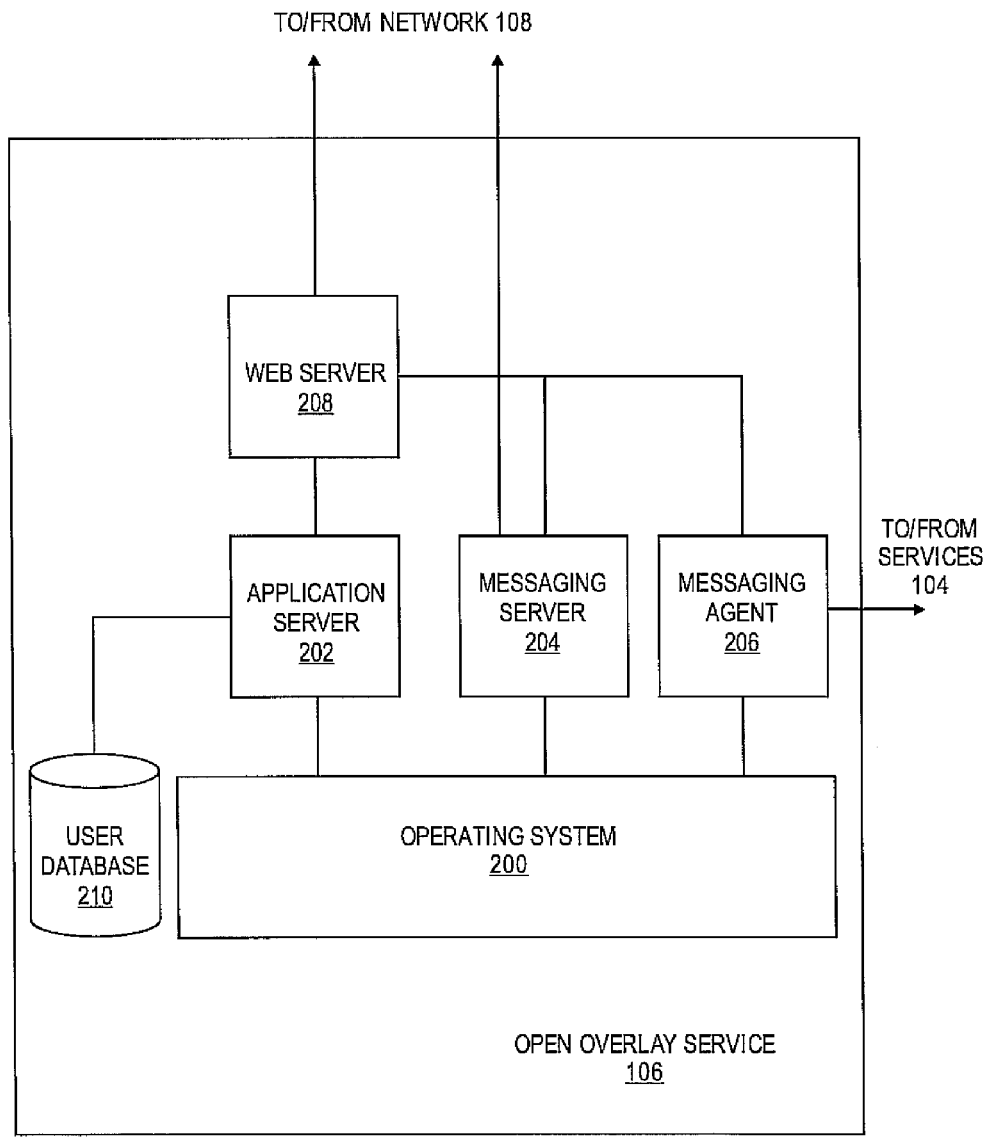
FIG. 2 illustrates an exemplary architecture for an open overlay service that is consistent with the principles of the present invention.

FIG. 2 illustrates an exemplary architecture for open overlay service 106 that is consistent with the principles of the present invention. As shown, open overlay service 106 may comprise an operating system 200, an application server 202, a messaging server 204, a messaging agent 206, a web server 208, and a user database 210. These components may be implemented as software, firmware, or some combination of both, which may be loaded into memory of the machine embodying open overlay service 106. The software components may be written in a variety of programming languages, such as C, C++, Java, etc. These components will now be generally described.

Operating system (OS) 200 is an integrated collection of routines that service the sequencing and processing of programs and applications running in open overlay service 106. OS 200 may provide many services, such as resource allocation, scheduling, input output control, and data management. OS 200 may be predominantly software, but may also comprise partial or complete hardware implementations and firmware. Well known examples of operating systems that are consistent with the principles of the present invention include the Linux operating system, the UNIX operating system. In addition, OS 200 may operate in conjunction with other software, such as an application server, such as JBoss, to implement various features of open overlay service 106.

Application server 202 provides the logic for analyzing and managing the operations of open overlay service 106. As previously noted, application server 202 may be written in a variety of programming languages, such as C, C++, Java, etc.

For example, one responsibility of application server 202 may be managing the various identities of the users of open overlay service 106. As noted previously, a single person may have multiple identities that they use for various online services and social networks. For example, a person named, John Smith, may use jsmith@domain.com as an identity one service, but use smithj@domain2.com as his identity on another service.

In one embodiment, in order to track the various users of open overlay service 106, application server 202 may assign each user a unique identifier, such as a numeric identifier. Application server 202 may then utilize this unique identifier with the identity resources (i.e., email address, account names, screen names, etc.) used by services 104 to identify a person. In some embodiments, application server 202 generates a graph of each social network within open overlay service 106 in terms of person's names and the identity resources from the point of view of a particular user based on what is trusted by that user.

For example, given information about a person's name, their unique identifier assigned by application server 202, and associations to identity resources trusted by other users, application server 202 can generate a list of person names and identity resources (i.e., email address, account names, etc.) that should be visible to a particular user. Hence, the particular user will only be allowed to see identity resources they happen to (or only) know about that user and identity resources that have been verified by application server 202. For example, a user A may have a unique identifier of 2345, and email address #1 and email address #2 as identity resources, A user B may only know about email address #1 for user A. Meanwhile, a user C may similarly only know about email address #2 for user A. Thus, for user B, application server 202 will only allow user B to view and use email address #1 as an identity resource for user A. Likewise, application server 202 will only allow user C to view and use email address #2 as an identity resource for user A. However, if user A subsequently explicitly indicates to application server 202 that both users B and C can be trusted, then users 13 and C will then be also allowed to view both email addresses #1 and 2, as well. The primary uses of this information by open overlay service 106 may be for sharing a link with person by addressing that person either by an email address or by a short nickname, or for viewing a list of persons in open overlay service 106 that they think they know.

Application server 202 may also determine what information of a user should be public or private. In some embodiments, application server 202 may default to making information public, but provide an option, such as a checkbox, that allows the user to designate information as private. Application server 202 may also employ per page settings, such as all private or all public. Other privacy policies may be implemented by application server 202.

Application server 202 may further provide various search features. For example, application server 202 may allow users to search for other users based on various criteria, such as age, gender, school, etc. Application server 202 may also allow searches for various resources, such as email addresses, topics, links, etc.

Messaging server 204 manages communications between open overlay service 106 and clients 102 via network 108. For example, messaging server 204 may be configured to periodically poll clients 102 on a regular basis and have them request information from services 104. Messaging server 204 may be implemented based on well-known hardware and software and utilize well-known protocols, such as TCP/IP, hypertext transport protocol, etc.

Messaging server 204 may be configured to handle a wide variety of data and may handle data that is in any format. For example, information from clients 102 may be in the form of an extensible markup language (XML) file or a network location, such as a uniform resource locator (URL) on the Internet. Alternatively, messaging server 204 may be configured to obtain information from services 104 directly in a peer-to-peer fashion.

Messaging agent 206 serves as an interface between open overlay service 106 and online services 104 and may operate to monitor the activity of clients 102 at these services. In particular, messaging agent 206 may be a relatively small and focused computer application (or "bot") that runs continuously, in the background simultaneously for each of clients 102, as other programs are being run, and responds automatically to activity on services 104 that may be of interest to clients 102, such as new messages, postings, and the like.

Messaging agent 206 may be created by open overlay service 106 (i.e., by application server 202) for the benefit of the users at clients 102. Alternatively, for example, messaging server 204 may send information to clients 102 upon request, perform automated searches, or monitor messages or events at services 104.

In one embodiment, messaging server 204 and/or messaging agent 206 may work in conjunction to perform client-side data scraping on services 104. Client-side data scraping may be desirable in some instances where services 104 refuse or block a direct interface with open overlay service 106. For example, MySpace and AOL's instant messaging service may be implemented as one of services 104, but is known to block proxy requests for a client.

Client-side data scraping may be initiated by messaging server 204 or using information provided by messaging server. Messaging server 204 may poll client overlay client 302 to trigger a request to one of services 104. Accordingly, overlay client 302 may cause one of service applications 306 to interface with service 104 and request data from that service, such as web page refresh. Since the request originated from client 102, service 104 will provide a response. Overlay client 302 may detect this response and forward it to messaging server 204. Messaging server 204 may then pass this response. Of course, the polling may be configured at overlay client 302 based on information provided to messaging server 204.

Messaging server 204 evaluates the response and determines if a notification event is needed. If notification is needed, messaging server 204 send a message to overlay client 302. The notification may then be displayed to the user using, for example, browser 304 or service application 306.

One application of client-side data scraping may be used to detect when messages or postings have been entered on one of services 104. For example, on MySpace, users often repeatedly refresh their pages in anticipation of receiving a post or message from a friend. With client-side data scraping, open overlay service 106 may automatically perform this function, and more conveniently, indicate when the user has received activity on their MySpace page. This notification may appear in the form of a pop-up bubble or may be displayed as a link on the user's page in open overlay service 106. Of course, other applications of client-side data scraping are consistent with the principles of the present invention.

Web server 208 provides a communications interface between open overlay service 106, clients 102, and services 104. For example, web server 208 may be configured to provide information that indicates the status of client 102. Such communications may be based on well known protocols and programming languages, such as HTTP, TCP/IP and Java. Interfaces provided by web server 208 may be implemented using well known Internet technologies, such as web pages, which are well known to those skilled in the art.

User database 210 maintains information identifying users and clients 102. User database 210 may be implemented using well known database technology, such as relational databases, or object oriented databases.

For example, user database 210 may include information indicating one or more operating systems and applications installed on clients 102 as well as services subscribed to by users. User database 210 may also comprise information related to authenticating a user determining the respective rights of a user relative to other users. For example, a user may select various groups or channels of content in which they are interested in receiving information. User database 210 may further include information that indicates the permissions and delivery of the information to clients 102. Other information that may be included in user database 210 may comprise information, such as system and individual permissions of clients 102 on services 104, activation keys, registration information, and payment information (such as credit card information).

Furthermore, user database 210 may include other information related to the manner in which open overlay service 106 communicates with clients 102. For example, this information may relate to periodicity of notifications, email addresses, format of the information, and the like. User database 210 may include data structures to log the activities and transactions of its users. Activities, such as recent links, history of operations, etc., that may be logged in user database 210 are well known to those skilled in the art.

Figure 3:
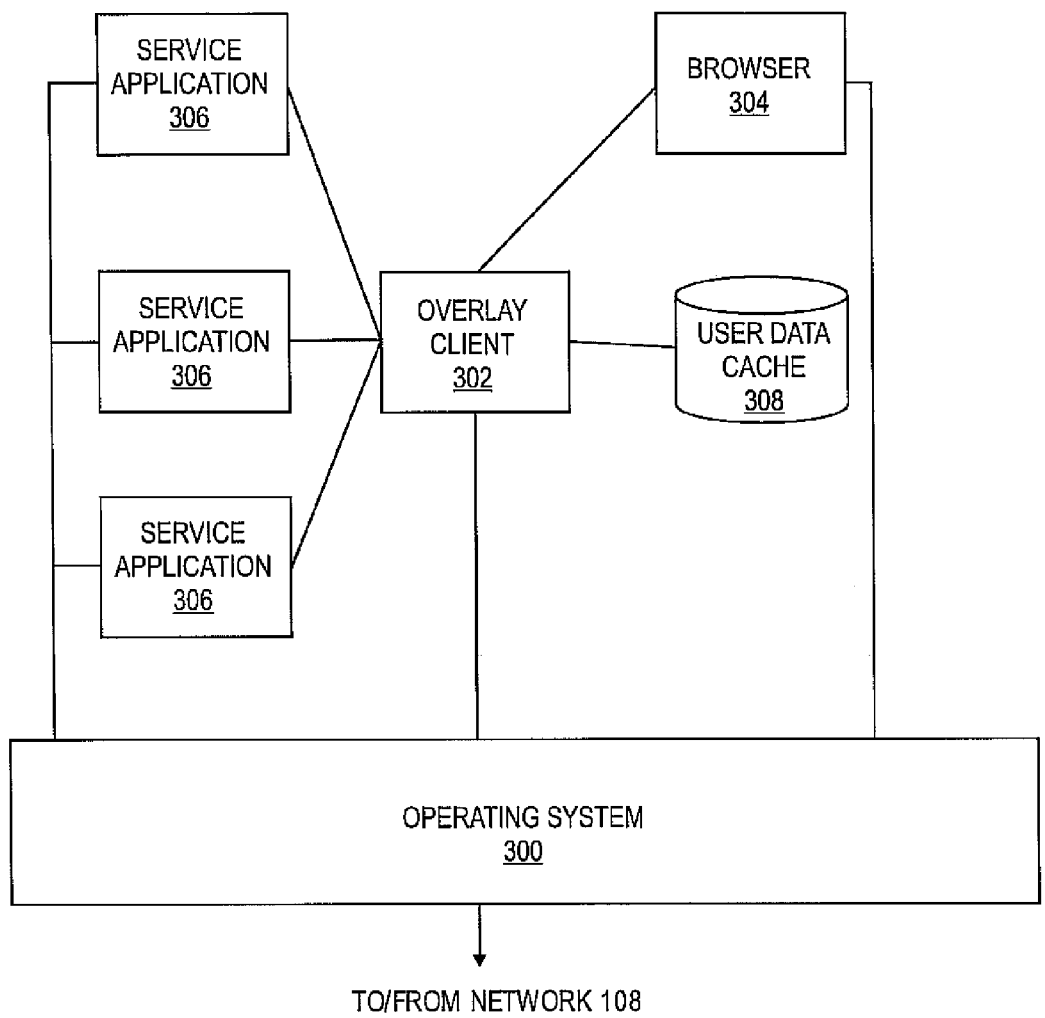
FIG. 3 illustrates an exemplary architecture for clients that are consistent with the principles of the present invention.

FIG. 3 illustrates an exemplary architecture for clients 102 that are consistent with the principles of the present invention. As noted, clients 102 may be implemented on a conventional device, such as personal computer, laptop, and the like. Such devices are well known to those skilled in the art and may typically include hardware, such as a processor, a memory, a display, a storage device, a keyboard, a mouse, and a network interface for network 108. Such hardware supports the operation of various components software. As shown, the software running on client 102 may comprise an operating system 300, an overlay client 302, a browser 304, one or more service applications 306, and a user data cache 308. Each of these software components will now be generally described.

Operating system (OS) 300 is an integrated collection of routines that service the sequencing and processing of programs and applications running in open overlay service 106. OS 300 may provide many services, such as resource allocation, scheduling, input/output control, and data management. OS 300 may be predominantly software, but may also comprise partial or complete hardware implementations and firmware. Well known examples of operating systems that are consistent with the principles of the present invention include Mac OS by Apple Computer, the Windows family of operating systems by Microsoft Corporation, and the Linux operating system.

Overlay client 302 maintains an inventory of the software and service applications 306 installed on client 102 and archives one or more states of activity on client 102. In some embodiments, overlay client 302 may be configured to periodically connect to open overlay service 106 and perform various operations requested by open overlay service. 106.

Browser 304 is an application that runs on client 102 and provides an interface to access information on network 108, such as information on services 104. Browser 304 may be implemented as well known programs, such as Mozilla Firefox, Microsoft Internet Explorer, Netscape Navigator, and the like.

Service applications 306 run on client 102 to support the services provided by services 104. For example, service applications 306 may be applications, such as a browser, an instant messaging client, a music player (such as iTunes), and the like that are provided from services 104. Other examples for applications 306 are well known to those skilled in the art.

User data cache 308 provides a cache that indicates the activity of a user at client 102. For example, user data cache 308 may include information that indicates documents, such as HTML pages, images, URL links, web site access times, and the like.

In order to illustrate some of the features of open overlay service 106 that provide a live social context, several examples of features will now be described, In one feature, a multimedia program or stream can be tagged with data or pointers to external information related to content of the multimedia program. Users of open overlay service 106 may then share and publish this information. Users may tag various aspects of the content, such as a particular actor, a type of car, jewelry, a location, a phrase, etc. For example, open overlay service 106 may provide a forum or website that allows users to enter tags that correspond to various portions of content in a multimedia program. Tagging information may then be linked to various websites that provide further information about the tagged content and may be keyed to video offset times. Open overlay service 106 may then provide this information to users in various social networks.

Alternatively, playback data may be collected from users viewing the multimedia program. The playback data may be used to identify various segments of the multimedia content, which may be of interest to users for tagging.

Figure 4:
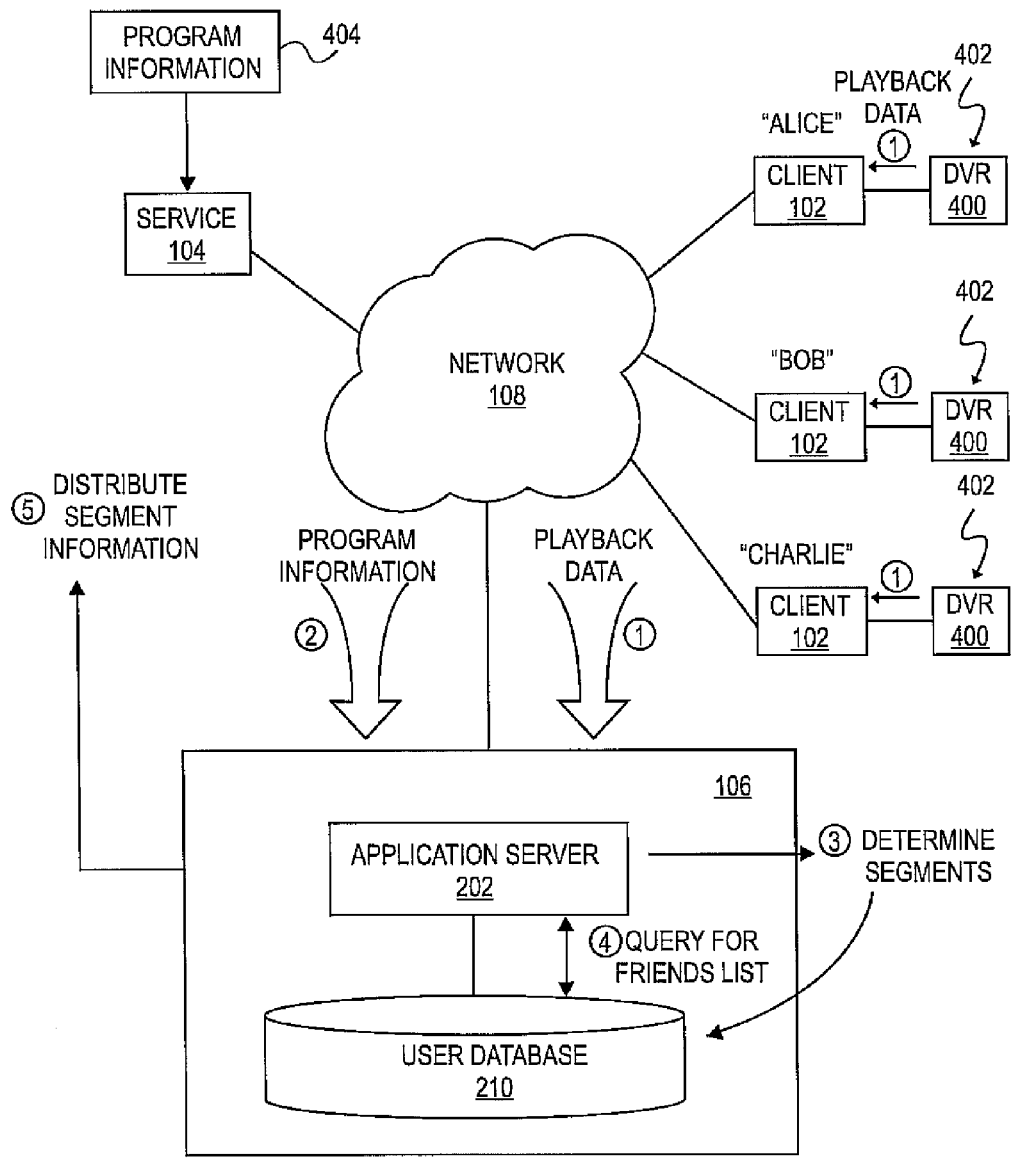
FIG. 4 illustrates an exemplary feature of the open overlay service that is consistent with the principles of the present invention.
Figure 5:
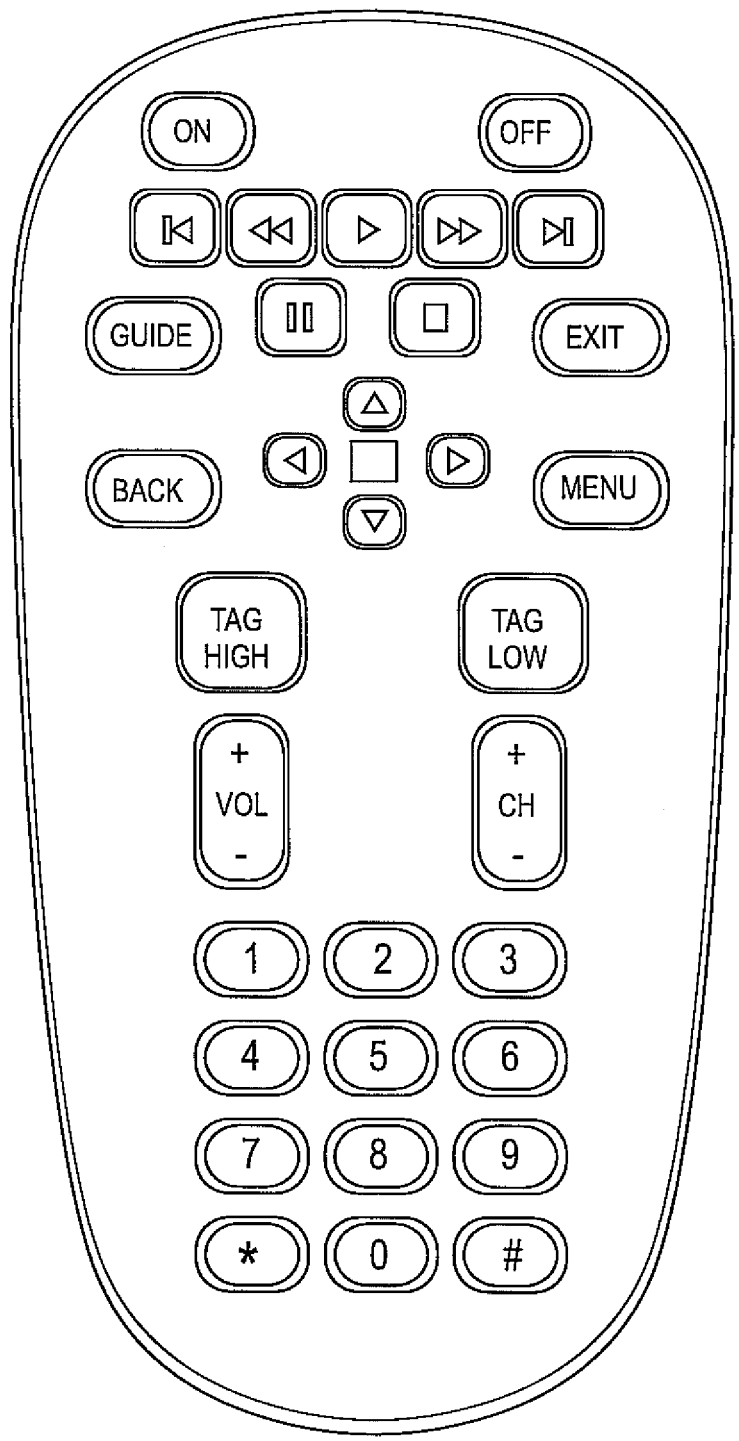
FIG. 5 illustrates an exemplary apparatus for use with the open overlay service that is consistent with the principles of the present invention.
Figure 6:
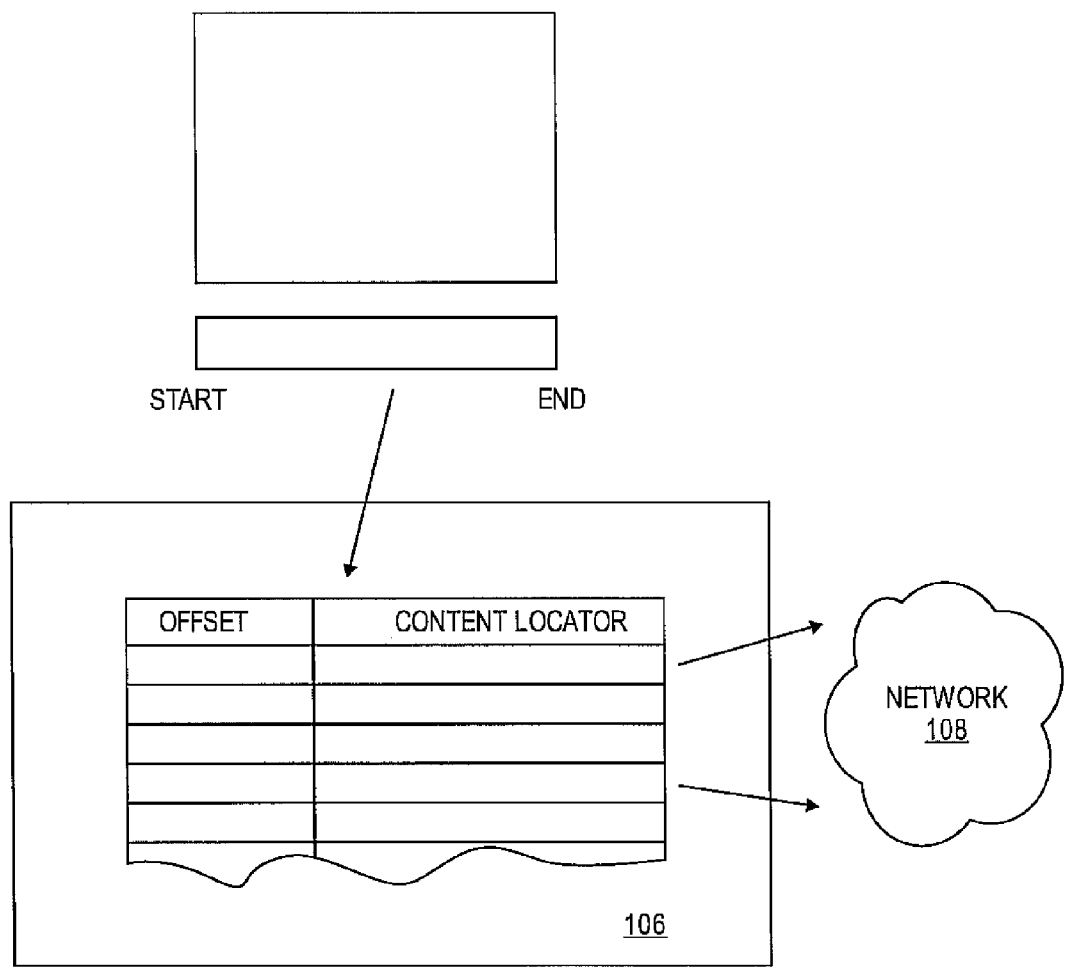
FIG. 6 illustrates an exemplary feature of the open overlay service that is consistent with the principles of the present invention.

FIG. 4 illustrates one example of how segments of content can be collected. In particular, open overlay service 106 may allow its users to automatically identify high/low value segments in content and then provide information to external links that elaborate on further information about the segment. For example, many users in a social network (such as a family or group of friends) may enjoy the same television show, sports, movies, and the like. In addition, these users may utilize digital video recorders (DVRs) while viewing these shows. However, these users may be interested in further information about something in the content or a segment of the content, such as a brand of car, an actor, a location, etc. The following description will now illustrate how users of the present invention can automatically identify and share high/low value contents with each other and provide links to external content about the segment.

Open overlay service 106 processes the data to identify offsets for the start and stop of non-interesting segments (e.g. boring commercials) or interesting segments (e.g. highlights of a baseball game). Open overlay service 106 then publishes information about the interestingness of segments (start time, end time, interestingness), either publicly or to the group that contributed the data. Open overlay service 106 may publish this information on a small scale ("most popular among my friends") or a larger scale ("most popular among cable viewers this week").

For purposes of illustration, FIG. 4 shows a scenario where clients 102 are labeled "Alice", "Bob" and "Charlie" are members of the same social network and use open overlay service 106. As shown, these users may each have their own DVRs 400 receiving a content signal 400 from a provider (not shown). Providers, such as DirecTV, Tivo, Comcast, and the like, are well known to those skilled in the art. In addition, one of services 104 may receive and provide program schedule information 404 of these providers.

Initially, Alice, Bob, and Charlie may watch content independently on their respective DVRs 400. During this viewing, their playback data may be monitored and collected. For example, overlay clients 302 may be configured to periodically poll DVRs 400 to collect this playback data. Alternatively, DVRs 400 may have their own application, such as one of service applications 306. For example, one of service applications 306 may be configured to retrieve program schedule information from service 104 over network 108. Accordingly, overlay client 302 may operate in conjunction with service application 306 to obtain playback data of the users.

Of note, the playback data may be collected actively or passively. For example, the users may be interactively prompted to tag a segment of a show as either high value or low value. Users may also actively tag various segments of a show. One skilled in the art will recognize that any type of segment, such as commercials, highlights, scenes, etc., may be tagged by the users.

Alternatively, playback data may be passively collected from the user. That is, the users' playback behavior is merely observed without requesting or prompting. For example, the playback data may simply indicate where the user paused, rewound, skipped forward, etc.

Clients 102 then send this playback data to open overlay service 106. Open overlay service 106 may, for example, periodically poll for this playback data from clients 102. Alternatively, clients 102 may be configured to provide their playback data at defined intervals or in real-time as it's collected.

In addition, open overlay service 106 may collect program information 404 from the various providers via service 104. This information allows open overlay service 106 to correlate and aggregate the various playback data for the same content. For example, the same show or movie may be played at different times by different providers. Thus, open overlay service 106 may operate across different providers and allow users to share segment information even if they use different providers.

Open overlay service 106 may aggregate the playback data, either at a central location in database 210 or by broadcasting results to multiple locations, such as service application 104. The aggregation could be done at a small scale ("most popular among my friends") or a larger scale ("most popular among all viewers this week") within open overlay service 106, Application server 202 may then process the playback data collected from clients 102 and program information 404 to determine segments of content that are of high or low interest to the users. For example, application server 202 may aggregate the playback data and determine the various commercial breaks in a show. In order to account for variances in the playback data and reaction times of the users, application server 202 may use one or more algorithms to determine the start and end times of segments. For example, application server 202 may calculate an average start and end time or a median start and end time based on the playback data collected from the users. Application server 202 may also various probabilistic or statistical methods to determine the start and end times of segments. Such algorithms are known to those skilled in the art.

Furthermore, application server 202 may determine separate segment boundaries for different social networks. For example, application server 202 may determine aggregate and determine segments for different families or groups of friends. This allows open overlay service 106 to provide distinct sharing among, its social networks. Alternatively, application server 202 may aggregate playback data from all of its users. Such information may be useful for certain types of segments, such as commercials. Of course, application server 202 may use a combination of these techniques.

Application server 202 then queries database 210 to retrieve a list of users and groups that may be interested in the segment information for a particular show. For example, clients 102 may selectively choose segments identified by one or more social networks or groups or elect segments that have been collected from all of the users of open overlay service 106. This feature allows various social networks to selectively choose which segment information they receive. Sports highlights in a show may be of interest to one group of users or social network. In contrast, highlights of a particular actor or musical group in the same show may be of interest to another group of users or social network.

For example, in the scenario shown in FIG. 4, Alice, Bob and Charlie are part of the same social network and may be interested in sharing segment information with each other. For each of these users, application server 202 then queries database 210 to determine retrieve which provider used by Alice, Bob, and Charlie. For example, Alice and Bob may use DirecTV, but Charlie may use Tivo.

Application server 202 may then distribute the segment information to Alice, Bob, and Charlie. The segment information may be sent to overlay client 302, or as directly to service application 306 for DVRs 400. The segment information may be sent periodically, on-demand, etc. based on the preferences of the clients 102. One skilled in the art will recognize that there is wide variety of ways that the segment information can be distributed.

Application server 202 may also filter the segment information distributed to clients 102 based on that client's profile or other criteria. For example, application server 202 may filter the segment information sent to Alice based on various criteria, such as Alice's age, Alice's location, Alice's other activities in open overlay service 106 as indicated in cache 308, etc. For example, segment information that contains adult material may be filtered from being sent to Alice.

Furthermore, application server 202 may send various accompanying information with the segments. For example, this accompanying information may be information that indicates comments by users about the segment, descriptive phrases, timing information, duration of the segment, and the like about the segment.

Once provided the segment information, users at clients 102 may subsequently add elaborating information and links to external, related content about these segments. For example, open overlay service 106 may provide the segment information in a table format or wiki format on a web page. Users may then freely enhance this information and provided related links to related content.

The information may be a wide variety and indicate any level of detail desired. For example, the information added may be about particular actor, a type of car, jewelry, a location, a phrase, history of a location, and the like. The information may also include links to other websites and service applications 104 that are related to content in the segment. For example, a commercial segment may later have the subject's website added. Other examples include links to blogs, maps, video clips, audio clips, etc.

As the segment information is elaborated, application server 202 may then notify various users about this event. The notification may be limited to just the users of the social network from which the information originated, i.e., to Alice, Bob, and Charlie, or the notification could be broadcast to one or more groups or the all the users of open overlay service 106. These notifications may be sent periodically, on-demand, etc. based on the preferences of the clients 102. One skilled in the art will recognize that there is wide variety of ways that information related to segments can be distributed.

Application server 202 may also filter which of clients 102 receive the related information based on that client's profile or other criteria. For example, application server 202 may filter the related information sent to Alice based on various criteria, such as Alice's age, Alice's location, Alice's other activities in open overlay service 106 as indicated in cache 308, etc. For example, related information that contains adult material may be filtered from being sent to Alice.

Furthermore, application server 202 may send various accompanying information about the related information and links. For example, this accompanying information may be information that indicates who submitted the related information, when the information was added, etc.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, comprising:
receiving, via a server computing device executing an open overlay service that manages information distribution between multiple social network services and allows users to indicate which identity resources to share with other users, user-submitted ratings for content that users have actively tagged as high value or low value content, wherein the user-submitted ratings are received from different content providers to allow segment information sharing for the content across the different content providers, and wherein a first user has a first identity resource and a second identity resource, and, in response to a sharing indication from the first user, a second user that has knowledge of the first identity resource and does not have knowledge of the second identity resource is allowed to view both the first identity resource and the second identity resource;
identifying a start time and an end time for each of a plurality of segments of the content segments in view of the user-submitted ratings;
providing data that indicates the start time and the end time of a segment in the plurality of segments in view of the user-submitted ratings to users of the multiple social network services;
receiving, from one of the users, locations of external resources relating to the segment in view of the user-submitted ratings, wherein the external resources indicate a website, a person appearing in the segment, an object appearing in the segment, and a place appearing in the segment; and
providing the locations and the segment to a shared identity resource of another one of the users of another one of the multiple social network services via a website of the open overlay service, wherein the locations are keyed to an offset time of the segment.

2. The method of claim 1, further comprising:
receiving information related to the content; and
wherein identifying the start times and the end times is further in view of the information related to the content.

3. The method of claim 1, wherein the identity resources are email addresses.

4. The method of claim 1, wherein the identity resources are account names.

5. A method, comprising:
receiving, via a server computing device executing an open overlay service that manages information distribution between multiple social network services and allows users to indicate which identity resources to share with other users, user-submitted ratings for content that users have actively tagged as high value or low value content, wherein the user-submitted ratings are received from different content providers to allow segment information sharing for the content across the different providers, and wherein a first user has a first identity resource and a second identity resource, and, in response to a sharing indication from the first user, a second user that has knowledge of the first identity resource and does not have knowledge of the second identity resource is allowed to view both the first identity resource and the second identity resource;

identifying a start time and an end time for each of a plurality of segments of the content segments in view of the user-submitted ratings;

providing data that indicates the start time and the end time of a segment in the plurality of segments to users of the multiple social network services;

receiving, from one of the users, locations of external resources relating to the segment in view of the user-submitted ratings, wherein the external resources indicate a website, a person appearing in the segment, an object appearing in the segment, and a place appearing in the segment; and providing the locations and the segment to a shared identity resource of another one of the users of one of the multiple social network services via a website of the open overlay service, wherein the locations are keyed to an offset time of the segment.

6. The method of claim 5, further comprising:

receiving, from one of the users in the multiple social network services, related external information about content of a multimedia program, wherein a selected segment comprises the content;

tagging the multimedia program with pointers to the related external information; and notifying another one of the users of the multiple social network services that the multimedia program has been tagged.

7. The method of claim 5, wherein the identity resources are email addresses.

8. The method of claim 5, wherein the identity resources are account names.

9. A non-transitory computer readable storage medium having instructions stored thereon that, when executed by a processing device, cause the processing device to perform operations comprising:

receiving, via a server computing device executing on an open overlay service that manages information distribution between multiple social network services and allows users to indicate which identity resources to share with other users, user-submitted ratings for content that users have actively tagged as high value or low value content, wherein the user-submitted ratings are received from different content providers to allow segment information sharing for the content across the different content providers, and wherein a first user has a first identity resource and a second identity resource, and, in response to a sharing indication from the first user, a second user that has knowledge of the first identity resource and does not have knowledge of the second identity resource is allowed to view both the first identity resource and the second identity resource;

identifying a start time and an end time for each of a plurality of segments in view of the user-submitted ratings;

providing data that indicates the start time and the end time of a segment in the plurality of segments in view of the user-submitted ratings to users of the multiple social network services;

receiving, from one of the users, locations of external resources relating to the segment in view of the user-submitted ratings, wherein the external resources indicate a website, a person appearing in the segment, an object appearing in the segment, and a place appearing in the segment; and providing the locations and the segment to a shared identity resource of another one of the users of another one of the multiple social network services via a website of the open overlay service, wherein the locations are keyed to an offset time of the segment.

10. The non-transitory computer readable storage medium of claim 9, wherein the identity resources are email address addresses.

11. The non-transitory computer readable storage medium of claim 9, wherein the identity resources are account names.

12. An apparatus, comprising:

a memory to store instructions for an open overlay server that manages information distribution between multiple social network services and allows users to indicate which identity resources to share with other users; and a processing device, coupled to the memory, to execute the instructions for the open overlay server, wherein the processing device is to:

receive, via a server computing device executing an open overlay service that manages information distribution between the multiple social network services, user-submitted ratings for content that users have actively tagged as high value or low content, wherein the user-submitted ratings are received from different content providers to allow segment information sharing for the content across the different content providers, and wherein a first user has a first identity resource and a second identity resource, and, in response to a sharing indication from the first user, a second user that has knowledge of the first identity resource and does not have knowledge of the second identity resource is allowed to view both the first identity resource and the second identity resource;

identify a start time and an end time for each of a plurality of segments of the content segments in view of the user-submitted ratings;

provide data that indicates the start time and end time of a segment in the plurality of segments in view of the user-submitted ratings to users of the multiple social network services;

receive, from one of the users, locations of external resources relating to the segment in view of the user-submitted ratings, wherein the external resources indicate a website, a person appearing in the segment, an object appearing in the segment, and a place appearing in the segment; and provide the locations and the segment to a shared identity resource of another one of the users of another one of the multiple social network services via a website of the open overlay service, wherein the locations are keyed to an offset time of the segment.

13. The apparatus of claim 12, wherein the identity resources are email addresses.

14. The apparatus of claim 12, wherein the identity resources are account names.

* * * * *